(12) United States Patent
Matsukawa et al.

(10) Patent No.: US 8,854,466 B2
(45) Date of Patent: Oct. 7, 2014

(54) REARWARD VIEW ASSISTANCE APPARATUS DISPLAYING CROPPED VEHICLE REARWARD IMAGE

(75) Inventors: Norifumi Matsukawa, Nagoya (JP); Junshi Utsu, Nagoya (JP); Muneaki Matsumoto, Okazaki (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 13/339,840

(22) Filed: Dec. 29, 2011

(65) Prior Publication Data

US 2012/0169875 A1 Jul. 5, 2012

(30) Foreign Application Priority Data

Jan. 5, 2011 (JP) ................. 2011-000680

(51) Int. Cl.
 *H04N 7/18* (2006.01)
 *B60R 1/00* (2006.01)
(52) U.S. Cl.
 CPC .............. *B60R 1/00* (2013.01); *B60R 2300/302* (2013.01); *B60R 2300/305* (2013.01); *B60R 2300/70* (2013.01); *B60R 2300/8046* (2013.01)
 USPC ........................................................ 348/148
(58) Field of Classification Search
 CPC ................. H04N 7/18; B60R 2300/70; B60R 2300/302; B60R 2300/305
 USPC .................................................. 348/143, 148
 See application file for complete search history.

(56) References Cited

U.S. PATENT DOCUMENTS

| | | | |
|---|---|---|---|
| 6,498,620 B2 * | 12/2002 | Schofield et al. | 348/148 |
| 7,576,767 B2 * | 8/2009 | Lee et al. | 348/36 |
| 2009/0059005 A1 | 3/2009 | Hattori et al. | |
| 2009/0073263 A1 | 3/2009 | Harada et al. | |
| 2012/0154591 A1 * | 6/2012 | Baur et al. | 348/148 |
| 2014/0043479 A1 * | 2/2014 | Busch et al. | 348/143 |

FOREIGN PATENT DOCUMENTS

| | | |
|---|---|---|
| DE | 1020100020201 A * | 5/2011 |
| JP | 9-202180 | 8/1997 |
| JP | 10-257482 | 9/1998 |
| JP | 2002-369186 | 12/2002 |
| JP | 2006-173835 | 6/2006 |
| JP | 2007-325060 | 12/2007 |
| JP | 2009-055427 | 3/2009 |

OTHER PUBLICATIONS

Office Action issued Jan. 29, 2013 in corresponding Japanese Application No. 2011-000680 with English translation.
Office action dated Dec. 4, 2013 in corresponding Chinese Application No. 201210000842.8.
Office action dated Jul. 21, 2014 in corresponding Chinese Application No. 201210000842.8.

* cited by examiner

*Primary Examiner* — David Harvey
(74) *Attorney, Agent, or Firm* — Harness, Dickey & Pierce, PLC

(57) ABSTRACT

A rearward view assistance apparatus in a vehicle includes an imaging device that acquires a vehicle rearward image by taking a rearview from the vehicle, a control circuit that sets a cropped image by cropping part of the vehicle rearward image in response to a state of a vehicle, and a display device that is provided in a passenger compartment and displays the cropped image. The control circuit preferably overlays a lower portion of the cropped image with a mask. The control circuit preferably displays an indication corresponding to a rear portion of the vehicle on the cropped image. The rearward view assistance apparatus is thus provided to view rearward from the vehicle even when passengers are present on the seats in the second and third rows.

7 Claims, 15 Drawing Sheets

REARWARD CROPPED IMAGE
(LOW VEHICLE SPEED OR REST)

REARWARD CROPPED IMAGE
(MODERATE VEHICLE SPEED)

REARWARD CROPPED IMAGE
(HIGH VEHICLE SPEED)

LEFT REARWARD CROPPED IMAGE
(LOW VEHICLE SPEED OR REST)

LEFT REARWARD CROPPED IMAGE
(MODERATE VEHICLE SPEED)

LEFT REARWARD CROPPED IMAGE
(HIGH VEHICLE SPEED)

RIGHT REARWARD CROPPED IMAGE
(LOW VEHICLE SPEED OR REST)

RIGHT REARWARD CROPPED IMAGE
(MODERATE VEHICLE SPEED)

RIGHT REARWARD CROPPED IMAGE
(HIGH VEHICLE SPEED)

LEFT PARALLEL-PARKING IMAGE

REARWARD MONITOR IMAGE

RIGHT PARALLEL-PARKING IMAGE

REARWARD VIEW ASSISTANCE APPARATUS DISPLAYING CROPPED VEHICLE REARWARD IMAGE

CROSS REFERENCE TO RELATED APPLICATION

The present application is based on and incorporates herein by reference Japanese Patent Application No. 2011-680 filed on Jan. 5, 2011.

FIELD OF THE INVENTION

The present invention relates to a rearward view assistance apparatus.

BACKGROUND OF THE INVENTION

[Patent document 1] JP 1997-202180 A

It is known to provide a technique to take images outside a vehicle by use of a vehicle camera and display the images on a monitor in the vehicle. Patent document 1 discloses a technique to take images of right and left views from a vehicle by use of vehicle cameras mounted to the right and left of the vehicle.

The technique of Patent document 1 is to view the right and left directions from the vehicle. In the past, an optical rearview mirror installed in a passenger compartment is used for a driver to view rearward from the vehicle. When passengers are present on the seats in the second and third rows, a view of the optical rearview mirror may be interrupted by the passengers to make the rearward viewing difficult.

SUMMARY OF THE INVENTION

The present invention is accomplished in view of the above point. It is an object of the present invention to provide a rearward view assistance apparatus in which a driver is capable of viewing rearward from a vehicle even when passengers are present on seats in the second and third rows of the vehicle.

To achieve the above object, according to an aspect of the present invention, a rearward view assistance apparatus is provided as follows. An imaging device is included to acquire a vehicle rearward image by taking a rearview from a vehicle. A control circuit is included to set a cropped image by cropping the vehicle rearward image in response to a state of the vehicle. A display device is included to be provided in a passenger compartment and displays the cropped image.

According to the rearward view assistance apparatus of the above aspect, a cropped image produced by cropping part of a vehicle rearward image taken by use of the imaging device is displayable on the display device. Therefore, rearward viewing is possible even when passengers are present on seats in the second and third rows.

In the rearward view assistance apparatus of the above aspect, a cropped image produced by cropping part of a vehicle rearward image is displayed on the display device, so that a driver is capable of view rearward easier than when the vehicle rearward image is displayed directly, i.e., without modification.

BRIEF DESCRIPTION OF THE DRAWINGS

The above and other objects, features, and advantages of the present invention will become more apparent from the following detailed description made with reference to the accompanying drawings. In the drawings:

FIG. 3A is a "rearward cropped image (vehicle is at low speed or rest);"

FIG. 3B is a "rearward cropped image (vehicle is at moderate speed);"

FIG. 3C is a "rearward cropped image (vehicle is at high speed);"

FIG. 4A is a "left rearward cropped image (vehicle is at low speed or rest);"

FIG. 4B is a "left rearward cropped image (vehicle is at moderate speed);"

FIG. 4C is a "left rearward cropped image (vehicle is at high speed);"

FIG. 5A is a "right rearward cropped image (vehicle is at low speed or rest);"

FIG. 5B is a "right rearward cropped image (vehicle is at moderate speed);"

FIG. 5C is a "right rearward cropped image (vehicle is at high speed);"

FIG. 8A is a rest/reverse image;

FIG. 8B is a "rearward cropped image (vehicle is at low speed or rest);"

FIG. 8C is a "right rearward cropped image (vehicle is at low speed or rest);"

DETAILED DESCRIPTION OF THE PREFERRED EMBODIMENTS

Embodiments of the present invention are explained in reference to the appended drawings.

1. Structure of Rearward View Assistance Apparatus 1

Figure 1:
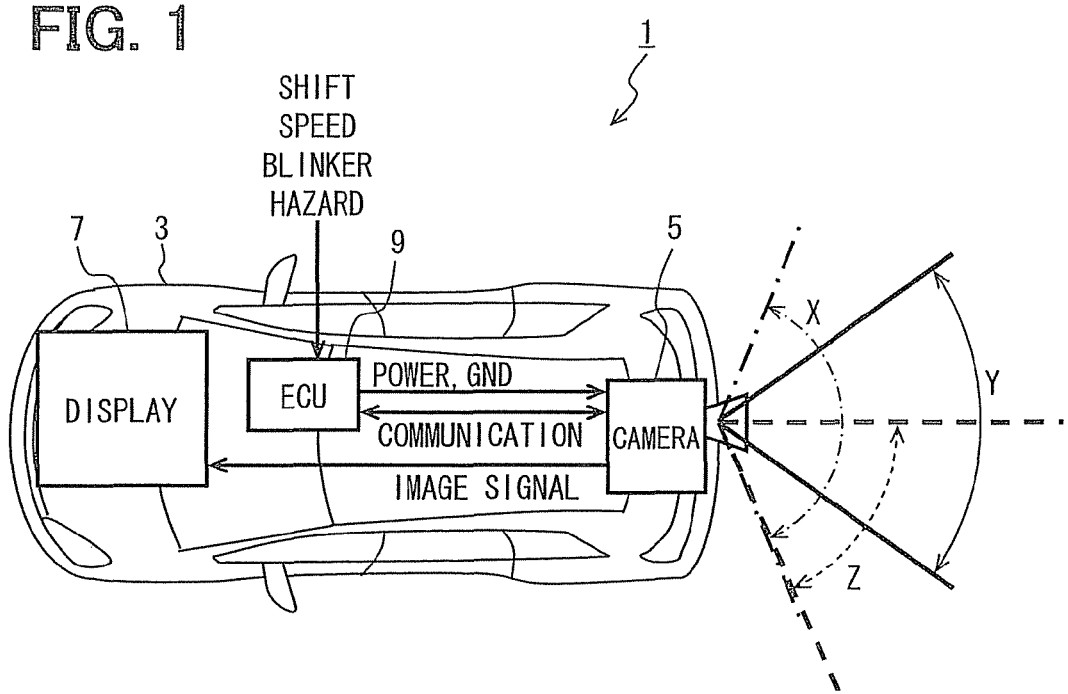
FIG. 1 is a block diagram showing a structure of a rearward view assistance apparatus.

A structure of a rearward view assistance apparatus 1 is explained in reference to FIG. 1. The rearward view assistance apparatus 1 is a vehicular apparatus mounted to a vehicle 3 (also referred to as a subject vehicle 3), and includes a camera (also referred to as an imaging device or means) 5 that takes or captures a rearview from the vehicle 3, a display (also referred to as a display device or means) 7 that is provided in a passenger compartment of the vehicle 3 and displays the overall or part of an image taken or captured by the camera 5, and an ECU (also referred to as a control circuit) 9.

The ECU 9 supplies power and GND to the camera 5 and communicates with the camera 5 to control the camera 5. The control of the camera 5 includes cropping part of a vehicle rearward image and setting the cropped image in response to a state of the vehicle 3, as mentioned below. The ECU 9 acquires states of the vehicle 3 to execute the processing to be hereinafter described; the states of the vehicle 3 include a shift position, a speed, a state of a blinker (left turn, right turn, no signal), and an ON/OFF of a hazard light by using well-known sensors such as a shift position detection device, a vehicle speed detection device, a blinker state detection device, and a hazard detection device.

The camera 5 is attached to the back end of the vehicle 3, and capable of acquiring or capturing images (hereinafter called vehicle rearward images) in the wide range shown by an angle X in FIG. 1. The camera 5 is capable of cropping part of a vehicle rearward image in response to a command from the ECU 9. The camera 5 outputs an image signal of a vehicle rearward image or a cropped image to a display 7. The cropped images include an image of a range centered directly behind the vehicle 3 shown by an angle Y in FIG. 1 and an image of a leftward range from the vehicle 3 shown by an angle Z in FIG. 1. The cropped image is mentioned later in detail.

Figure 2:
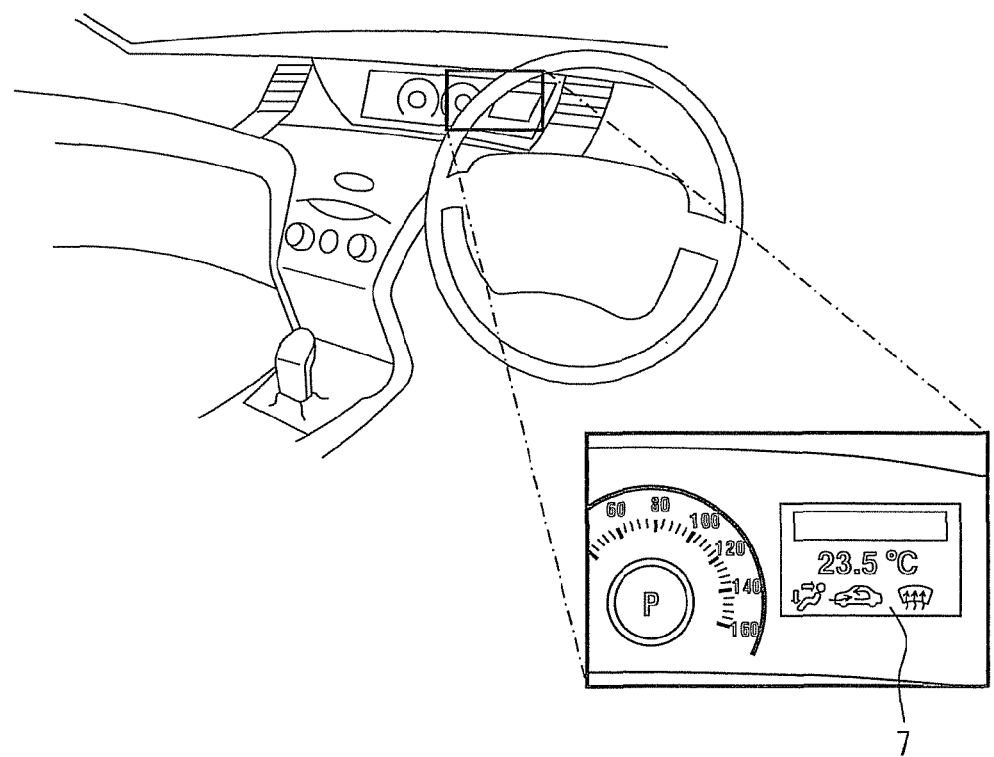
FIG. 2 is an explanatory view showing arrangement of a display in a vehicle.

The display 7 displays vehicle rearward images or cropped images. When a region of a cropped image in a vehicle rearward image is small, the cropped image is enlarged to a constant display size in the display 7. The display 7 can be provided to an instrument panel in a passenger compartment of the vehicle 3, as shown in FIG. 2. The display 7 can be provided also to the other places (for example, a rearview mirror etc.) in the passenger compartment.

2. Types of Image Displayed on the Display 7

Images displayed on the display 7 by the vehicle rearward view assistance apparatus 1 are as follows.

(1) Rearward Cropped Image

Figure 3A:
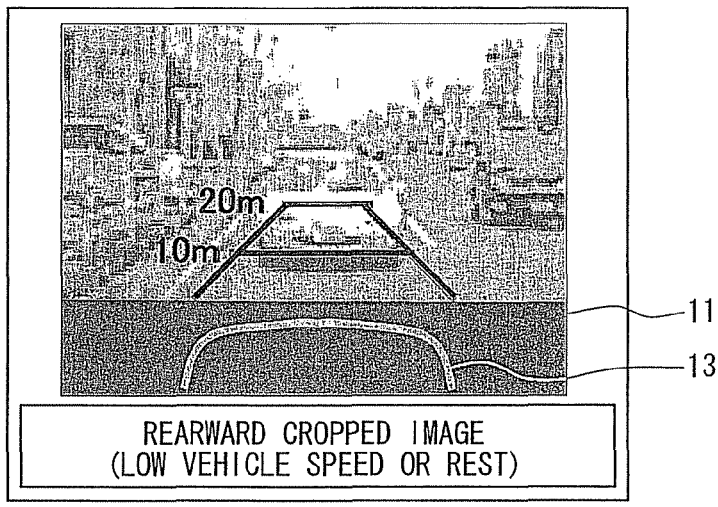
FIGS. 3A, 3B, and 3C are explanatory views showing rearward cropped images.
Figure 3B:
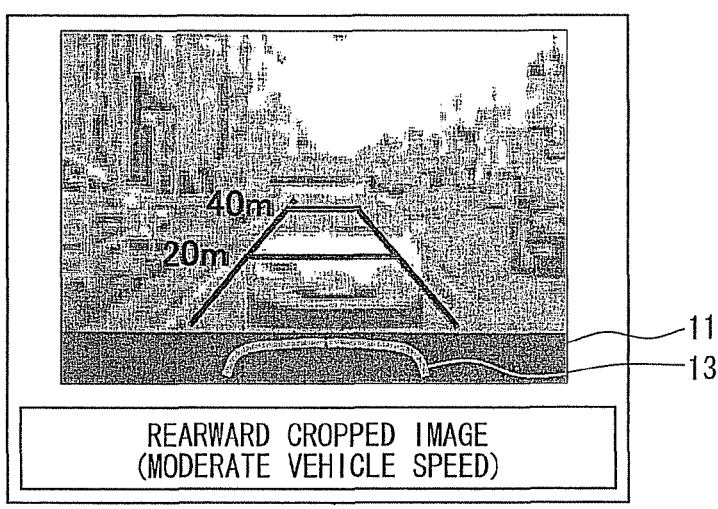
Figure 3C:
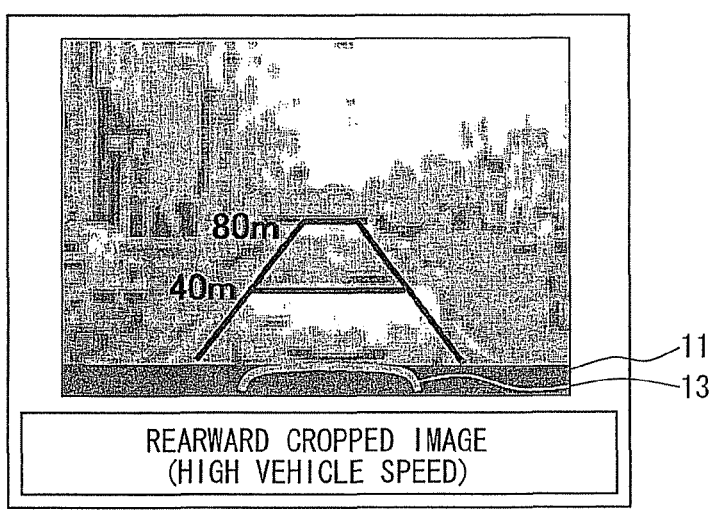

A rearward cropped image shows a laterally central, vertically upper region cropped from the vehicle rearward image. Therefore, the rearward cropped image shows a smaller region than the vehicle rearward image. The rearward cropped images have three types: a "rearward cropped image (vehicle is at low speed or rest)" in FIG. 3A; a "rearward cropped image (vehicle is at moderate speed)" in FIG. 3B; and a "rearward cropped image (vehicle is at high speed)" in FIG. 3C.

The "rearward cropped image (vehicle is at moderate speed)" shows a partial region of the "rearward cropped image (vehicle is at low speed or rest)," the partial region being smaller than the "rearward cropped image (vehicle is at low speed or rest)." The "rearward cropped image (vehicle is at high speed)" shows a partial region of the "rearward cropped image (vehicle is at moderate speed)," the partial region being smaller than the "rearward cropped image (vehicle is at moderate speed)." The lower portions of the "rearward cropped image (vehicle is at low speed or rest)," "rearward cropped image (vehicle is at moderate speed)," and "rearward cropped image (vehicle is at high speed)" are each overlaid with a mask 11 for image coverage. An outline 13 (also referred to as an indication) showing a shape of the rear portion of the vehicle 3 is displayed on the mask 11.

(2) Left Rearward Cropped Image

A left rearward cropped image shows a laterally left, vertically upper region cropped from the vehicle rearward image. Therefore, the left rearward cropped image shows a smaller region than the vehicle rearward image. In the left rearward cropped image, the directly rearward direction of the vehicle 3 is set as a border to divide the rearward view into right and left. Therefore, a lateral half of a vehicle directly behind the vehicle 3 is displayed.

Figure 4A:
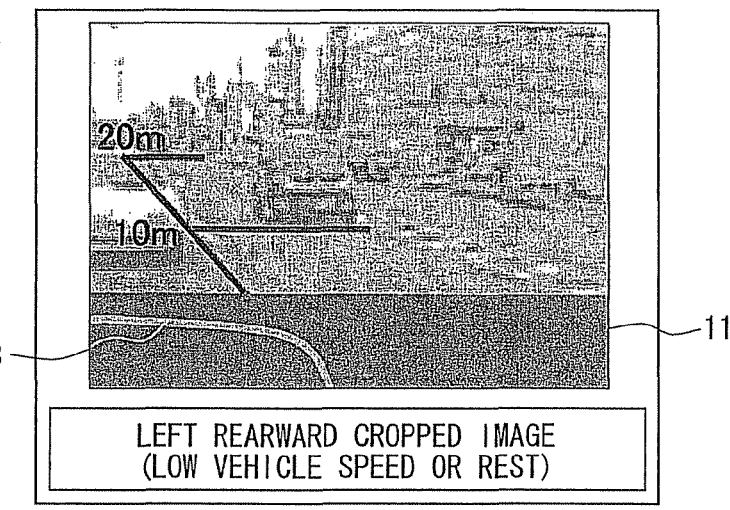
FIGS. 4A, 4B, and 4C are explanatory views showing left rearward cropped images.
Figure 4B:
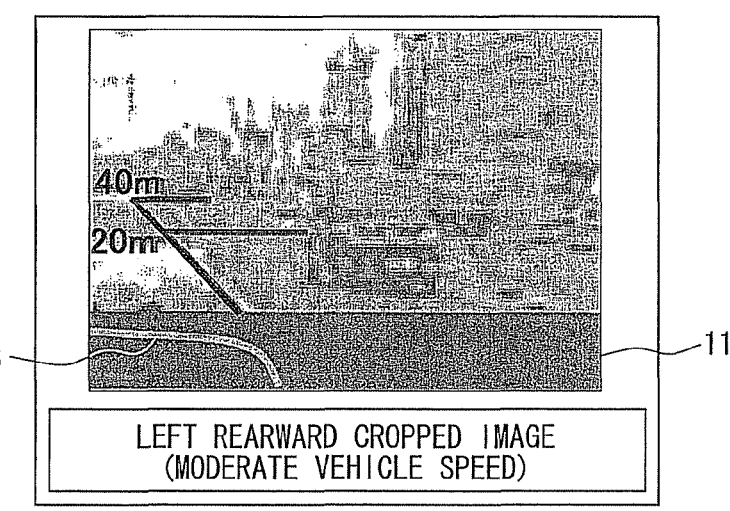
Figure 4C:
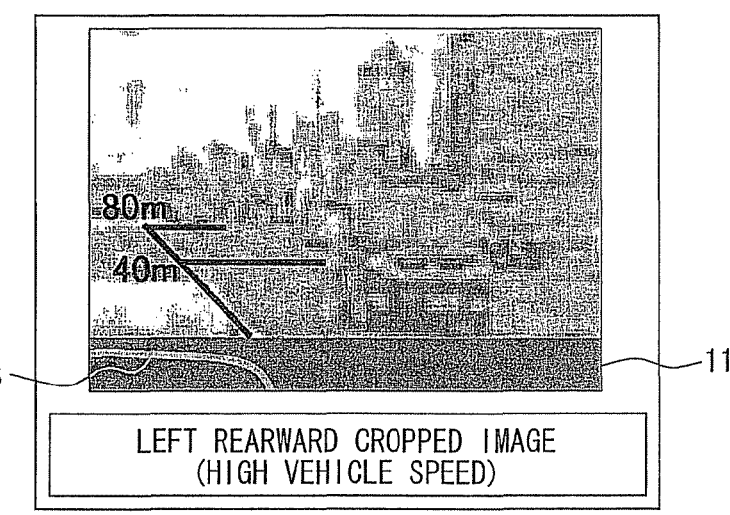

The left rearward cropped images have three types of image: a "left rearward cropped image (vehicle is at low speed or rest)" in FIG. 4A; a "left rearward cropped image (vehicle is at moderate speed)" in FIG. 4B; and a "left rearward cropped image (vehicle is at high speed)" in FIG. 4C.

The "left rearward cropped image (vehicle is at moderate speed)" shows a partial region of the "left rearward cropped image (vehicle is at low speed or rest)," the partial region being smaller than the "left rearward cropped image (vehicle is at low speed or rest)." The "left rearward cropped image (vehicle is at high speed)" shows a partial region of the "left rearward cropped image (vehicle is at moderate speed)," the partial region being smaller than the "left rearward cropped image (vehicle is at moderate speed)." The largeness of the region displayed by the "left rearward cropped image (vehicle is at low speed or rest)" is the same as that of the region displayed by the "rearward cropped image (vehicle is at low speed or rest)." The largeness of the region displayed by the "left rearward cropped image (vehicle is at moderate speed)" is the same as that of the region displayed by the "rearward cropped image (vehicle is at moderate speed)." The largeness of the region shown by the "left rearward cropped image (vehicle is at high speed)" is the same as that of the region shown by the "rearward cropped image (vehicle is at high speed)." The lower portions of the "left rearward cropped image (vehicle is at low speed or rest)," "left rearward cropped image (vehicle is at moderate speed)," and "left rearward cropped image (vehicle is at high speed)" are each overlaid with the mask 11 for image coverage. The outline 13 showing a shape of the rear portion of the vehicle 3 is displayed on the mask 11.

Unless otherwise noted, the term "right and left" means the right and left viewed from a driver facing in the forward direction.

(3) Right Rearward Cropped Image

The right rearward cropped image shows a laterally right, vertically upper region cropped from the vehicle rearward image. Therefore, the right rearward cropped image shows a smaller region than that of the vehicle rearward image. In the right rearward cropped image, the directly rearward direction of the vehicle 3 is set as a border to divide the rearward view into right and left. Therefore, the right rearward cropped image shows a lateral half of a vehicle directly behind the vehicle 3.

Figure 5A:
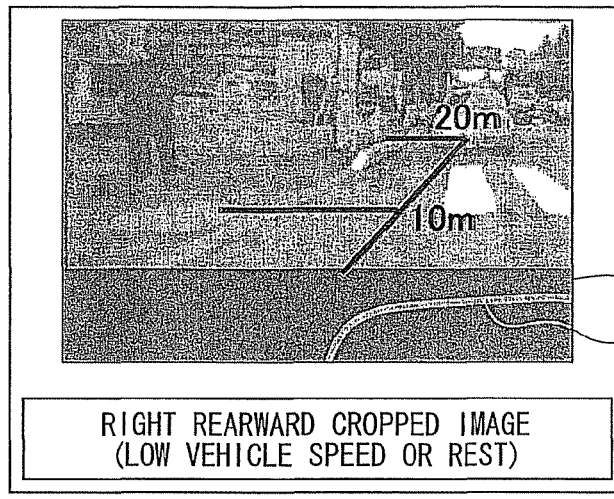
FIGS. 5A, 5B, and 5C are explanatory views showing right rearward cropped images.
Figure 5B:
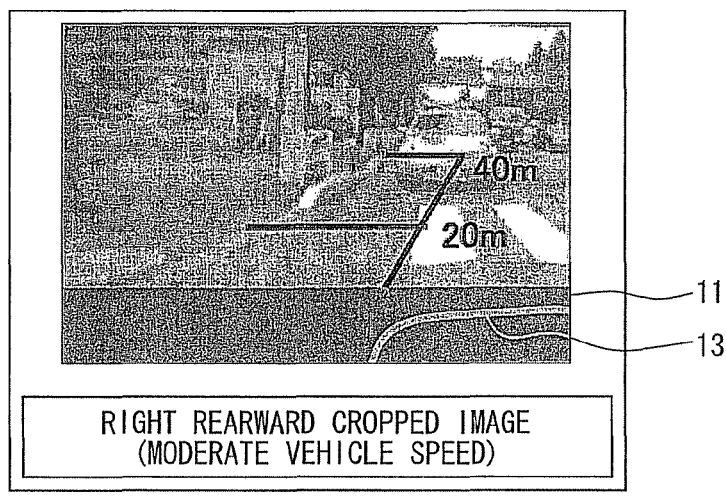
Figure 5C:
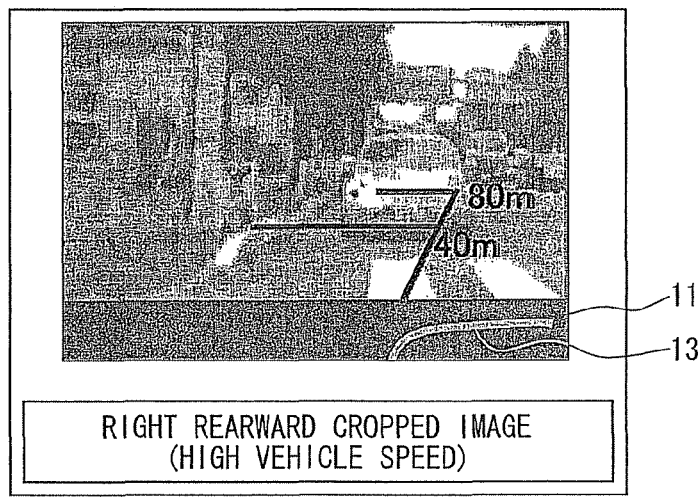

The right rearward cropped images have three types: a "right rearward cropped image (vehicle is at low speed or rest)" in FIG. 5A; a "right rearward cropped image (vehicle is at moderate speed)" in FIG. 5B; and a "right rearward cropped image (vehicle is at high speed)" in FIG. 5C.

The "right rearward cropped image (vehicle is at moderate speed)" shows a partial region of the "right rearward cropped image (vehicle is at low speed or rest)," the partial region being smaller than the "right rearward cropped image (vehicle is at low speed or rest)." The "right rearward cropped image (vehicle is at high speed)" shows a partial region of the "right rearward cropped image (vehicle is at moderate speed)," the partial region being smaller than the "right rearward cropped image (vehicle is at moderate speed)." The largeness of the region shown by the "right rearward cropped image (vehicle is at low speed or rest)" is the same as that of the region shown by the "rearward cropped image (vehicle is at low speed or rest)" and as that of the "left rearward cropped image (vehicle is at low speed or rest)." The largeness of the region shown by the "right rearward cropped image (vehicle is at moderate speed)" is the same as that of the region shown by the "rearward cropped image (vehicle is at moderate speed)" and as that of the "left rearward cropped image (vehicle is at moderate speed)." The largeness of the region shown by the "right rearward cropped image (vehicle is at high speed)" is the same as that of the region shown by the "rearward cropped image (vehicle is at high speed)" and as that of the "left rearward cropped image (vehicle is at high speed)." The lower portions of the "right rearward cropped image (vehicle is at low speed or rest)," "right rearward cropped image (vehicle is at moderate speed)," and "right rearward cropped image (vehicle is at high speed)" are each overlaid with the mask 11 for image coverage. The outline 13 showing a shape of the rear portion of the vehicle 3 is displayed on the mask 11.

(4) Left Parallel-parking Image

Figure 6A:
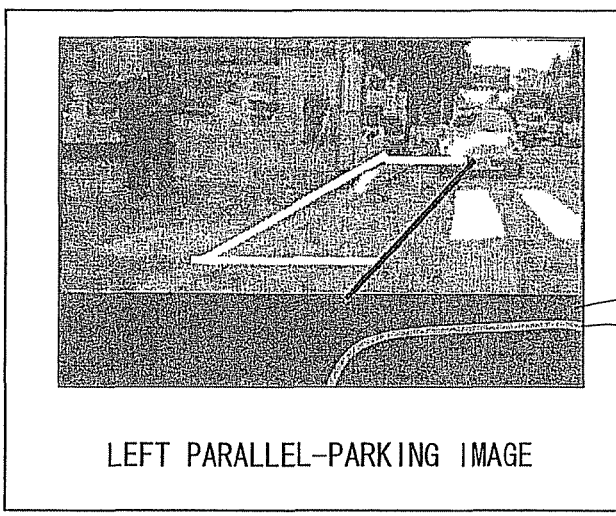
FIG. 6A is an explanatory view showing a left parallel-parking image.

A left parallel-parking image is shown in FIG. 6 A, and shows a laterally left region cropped from the vehicle rearward image. The left parallel-parking image contains the overall region of the "left rearward cropped image (vehicle is at low speed or rest)" and further its surrounding region. The left parallel-parking image shows a larger region than that of the "left rearward cropped image (vehicle is at low speed or rest)."

The lower portion of the left parallel-parking image is overlaid with the mask 11. The outline 13 showing a shape of the rear portion of the vehicle 3 is displayed on the mask 11.

(5) Rearward Monitor Image

Figure 6B:
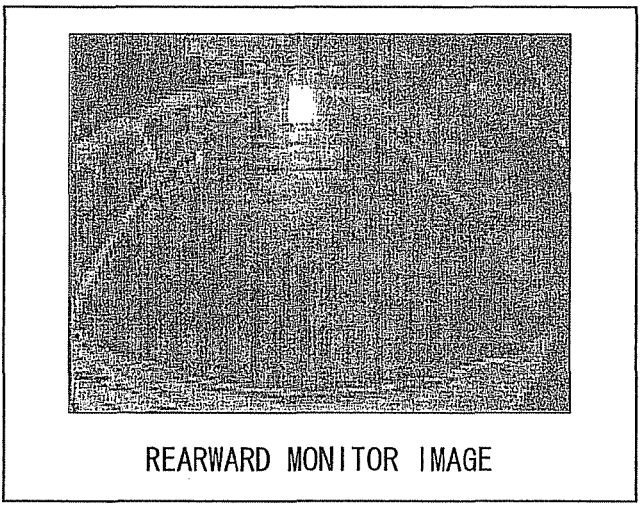
FIG. 6B is an explanatory view showing a rearward monitor image.

A rearward monitor image is shown in FIG. 6B and shows a laterally central region cropped from the vehicle rearward image. The rearward monitor image contains the overall region of the "rearward cropped image (vehicle is at low speed or rest)" and further its surrounding region. The rearward monitor image shows a larger region than that of the "rearward cropped image (vehicle is at low speed or rest)."

(6) Right Parallel-parking Image

Figure 6C:
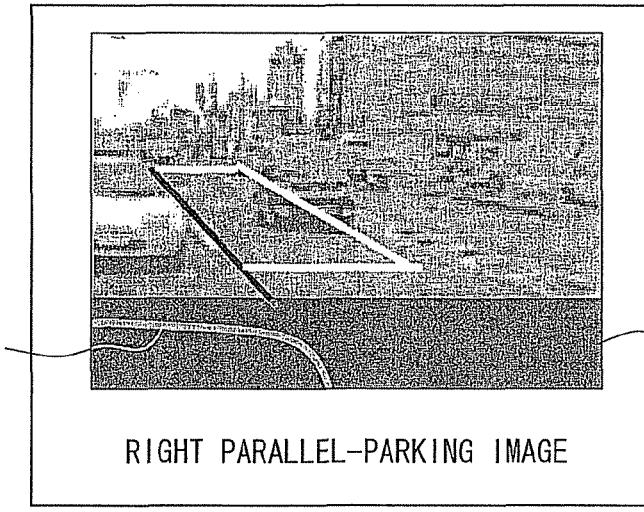
FIG. 6C is an explanatory view showing a right parallel-parking image.

A right parallel-parking image is shown in FIG. 6C, and shows a laterally right region cropped from the vehicle rearward image. The right parallel-parking image contains the overall region of the "right rearward cropped image (vehicle is at low speed or rest)" and further its surrounding region. The right parallel-parking image shows a larger region than that of the "right rearward cropped image (vehicle is at low speed or rest)."

The lower portion of the right parallel-parking image is overlaid with the mask 11. The outline 13 showing a shape of the rear portion of the vehicle 3 is displayed on the mask 11.

(7) Rest/Reverse Image

Figure 7:
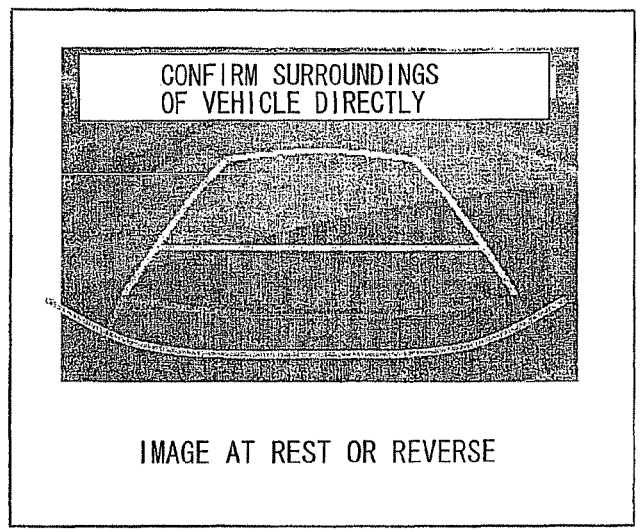
FIG. 7 is an explanatory view showing a rest/reverse image.

A rest/reverse image is shown in FIG. 7, and contains the overall region of the vehicle rearward image. The lateral center of the rest/reverse image corresponds to the directly rearward direction of the vehicle 3. The rest/reverse image shows a larger region than each of the rearward cropped image, left rearward cropped image, right rearward cropped image, left parallel-parking image, rearward monitor image, and right parallel-parking image.

Figure 8A:
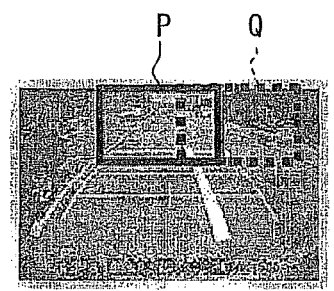
FIGS. 8A, 8B, and 8C are explanatory views showing their positional relationship.
Figure 8B:
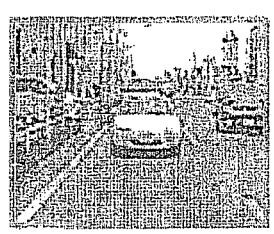
Figure 8C:
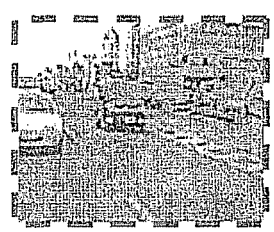

FIGS. 8A and 8B and 8C show positional relationship among the rest/reverse image, "rearward cropped image (vehicle is at low speed or rest)," and "right rearward cropped image (vehicle is at low speed or rest)." FIG. 8A shows the rest/reverse image. A region P in the rest/reverse image corresponds to the "rearward cropped image (vehicle is at low speed or rest)" of FIG. 8B. A region Q in the rest/reverse image corresponds to the "right rearward cropped image (vehicle is at low speed or rest)" of FIG. 8C.

3. Processing Executed by the Rearward View Assistance Apparatus 1

The processing executed by the rearward view assistance apparatus 1, i.e., by the ECU 9 is explained in reference to the flowcharts of FIGS. 9 to 17.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, a module, or means.

Each or any combination of sections explained in the above can be achieved as (i) a software section in combination with a hardware device (e.g., computer) or (ii) a hardware section, including or not including a function of a related device; furthermore, the hardware section may be constructed inside of a microcomputer.

Furthermore, the software section may be included in a software program, which may be contained in a non-transitory computer-readable storage media as a program product.

Figure 9:
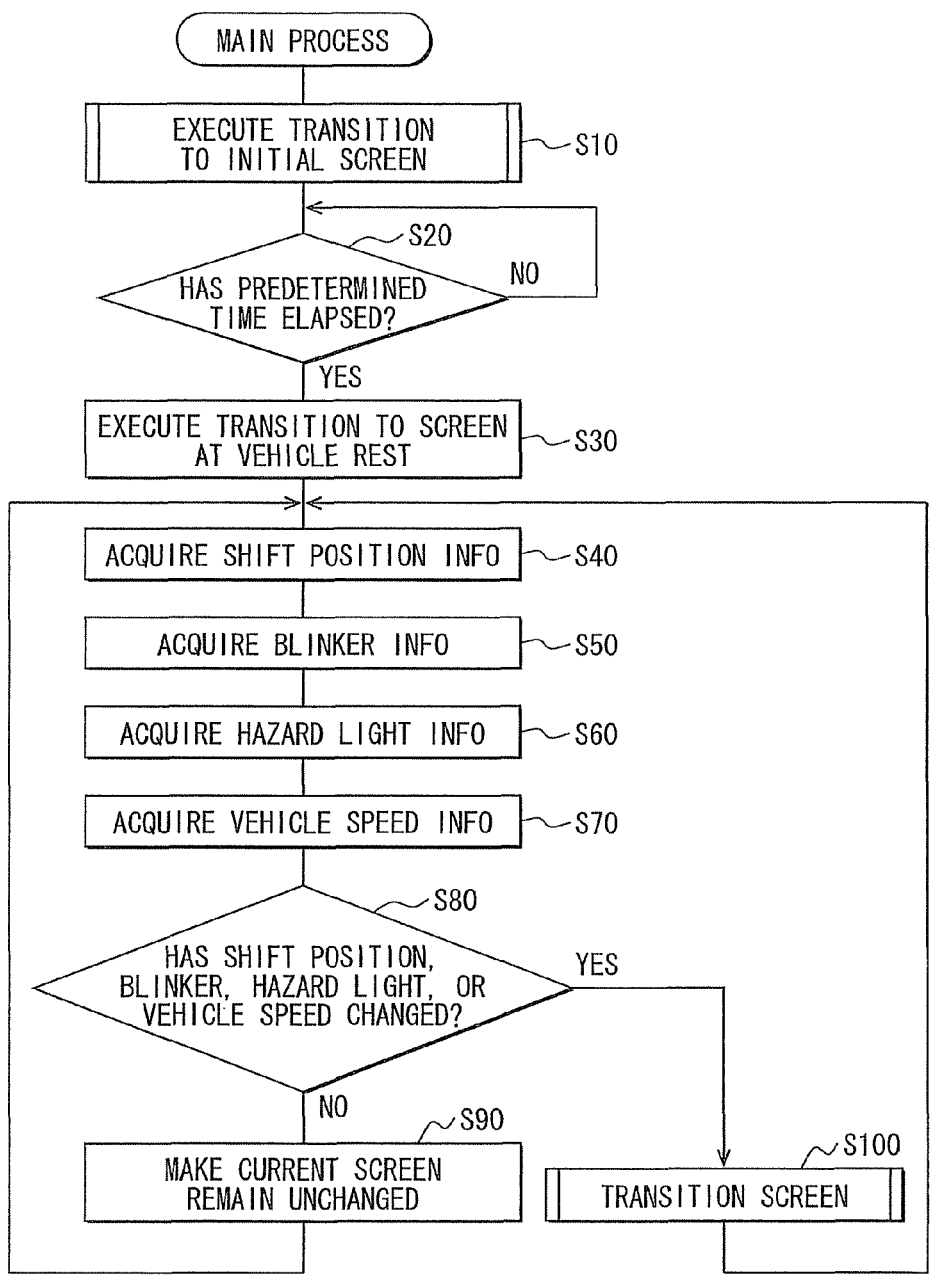
FIG. 9 is a flowchart showing the main processing executed by the rearward view assistance apparatus.

(1) First, the main processing is explained in reference to the flowchart of FIG. 9. The main processing is executed when an ignition of the vehicle 3 is turned ON.

At S10, an initial screen transition is performed. This initial screen transition is mentioned later.

At S20, it is determined whether a predetermined time has elapsed after the initial screen transition. When the predetermined time has elapsed, the process proceeds to S30, and when predetermined time has not yet elapsed, the process stays at S20.

At S30, a transition to a screen for vehicle rest is performed. In this transition, an image displayed until then transitions to the rest/reverse image (See FIG. 7).

At S40, shift position information on the vehicle 3 at this point (forward, rest, or reverse) is acquired.

At S50, blinker information on the vehicle 3 at this point (no signal, a right turn, or a left turn) is acquired.

At S60, hazard light information on the vehicle 3 at this point (ON/OFF of the hazard light) is acquired.

At S70, a vehicle speed of the vehicle 3 at this point is acquired.

At S80, it is determined whether the shift position information, blinker information, hazard light information, or vehicle speed acquired at the last S30 to S70 has changed from that acquired at S30 to S70 in the previous processing. When no information changes, the process proceeds to S90 and the screen of the display 7 remains unchanged (the type of the displayed image is not changed). On the other hand, when the shift position information, blinker information, hazard information, or vehicle speed has changed, the process proceeds to S100, at which the screen transition is executed. This screen transition is mentioned later.

Figure 10:
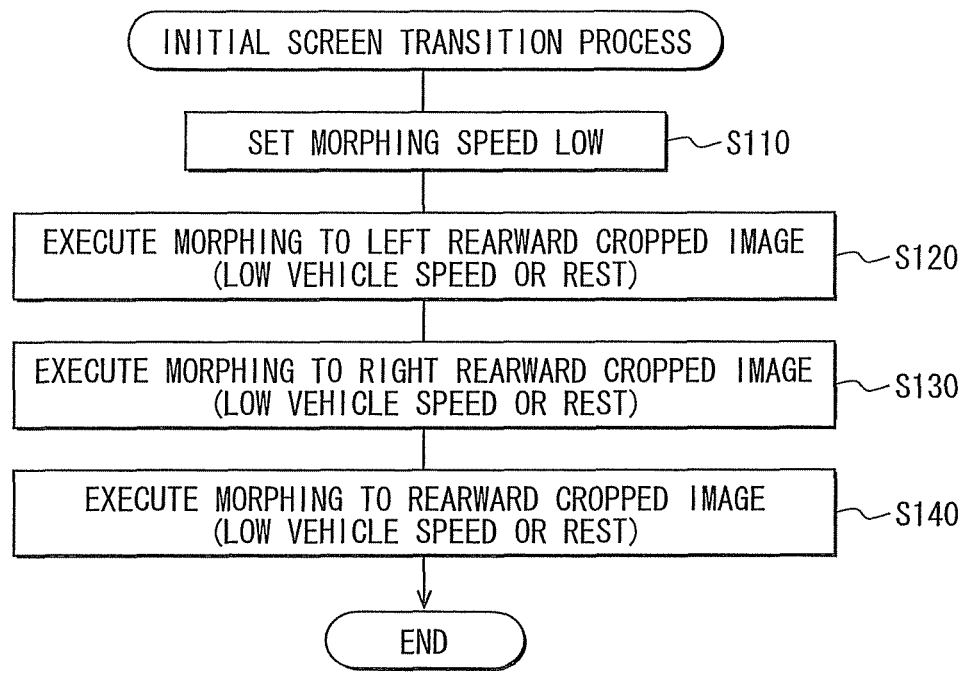
FIG. 10 is a flowchart showing the initial screen transition processing executed by the rearward view assistance apparatus.

(2) Next, the initial screen transition processing is explained in reference to the flowchart of FIG. 10.

At S110, a morphing speed is set as "low." Here, the morphing means a gradual change from an image before transition to an image after transition. For example, at first a ratio of the image before transition is 100%, then a ratio of the image after transition increases gradually, and finally the ratio of the image after transition becomes 100%. The morphing speed is a transition speed in morphing. The morphing speed has three steps, low, medium, and high. As the morphing speed is higher, the morphing completes for a shorter time. The set morphing speed is used in subsequent morphing operations until the morphing speed is reset.

At S120, an image displayed on the display 7 at this point is morphed to the "left rearward cropped image (vehicle is at low speed or rest)."

At S130, the image displayed on the display 7 is morphed from the "left rearward cropped image (vehicle is at low speed or rest)" to the "right rearward cropped image (vehicle is at low speed or rest)."

At S140, the image displayed on the display 7 is morphed from the "right rearward cropped image (vehicle is at low speed or rest)" to the "rearward cropped image (vehicle is at low speed or rest)."

Figure 11:
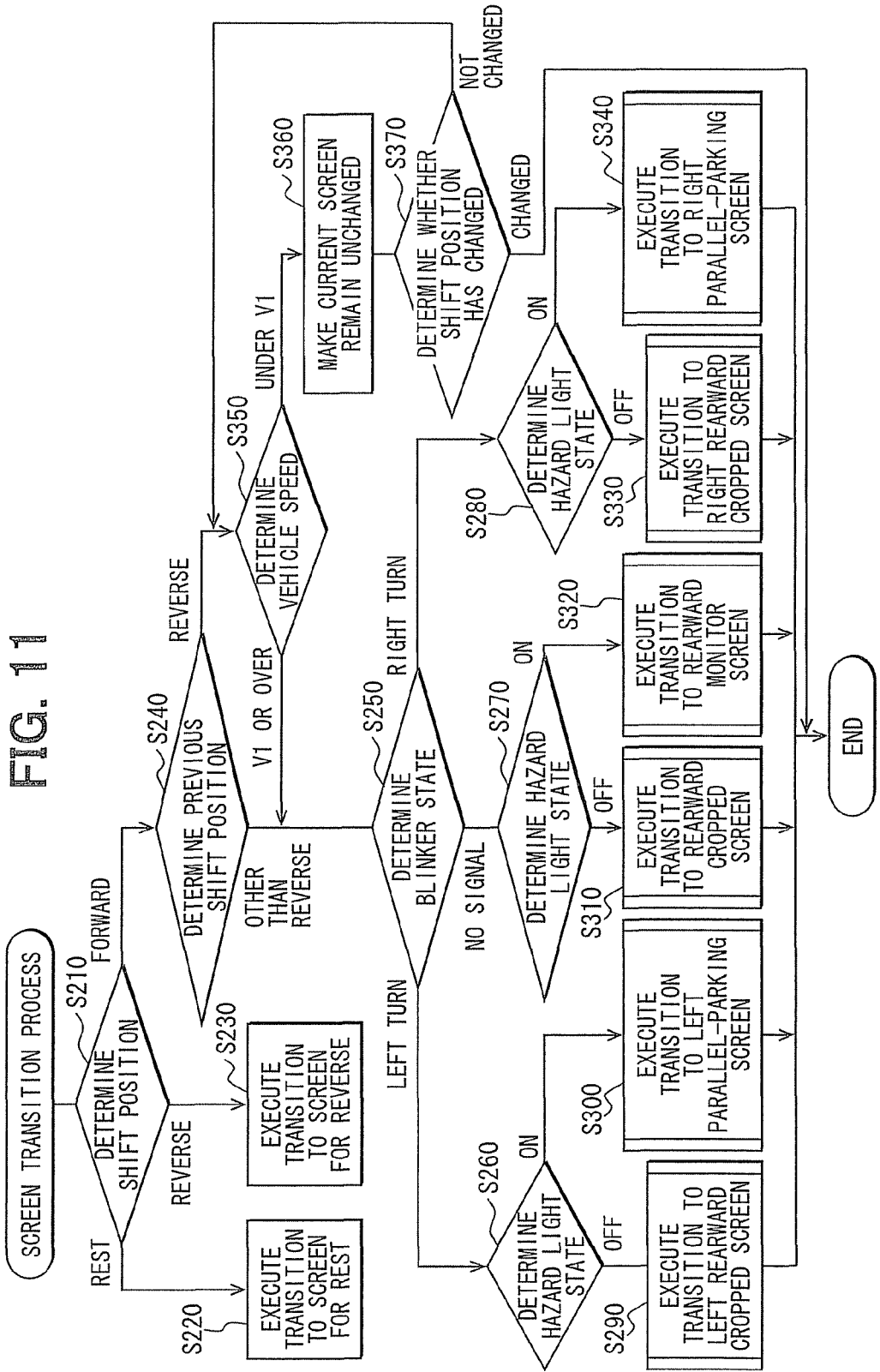
FIG. 11 is a flowchart showing the screen transition processing executed by the rearward view assistance apparatus.

(3) Next, the screen transition processing is explained in reference to the flowchart of FIG. 11.

At S210, a shift position of the vehicle 3 is determined on the basis of the shift position information acquired at the last S40. When the vehicle is at rest, the process proceeds to the transition to a screen for vehicle rest at S220 to display the rest/reverse image on the display 7. When the shift position is at reverse, the process proceeds to the transition to a screen for reverse at S230 to display the rest/reverse image on the display 7. When the shift position is at forward, the process proceeds to S240.

At S240, on the basis of the shift position information acquired at the previous S40 (to the "last" S40 by one main processing), the previous shift position in the vehicle 3 is determined. When the shift position is other than at reverse, the process proceeds to S250. When the shift position is at reverse, the process proceeds to S350.

At S250, a state of the blinker is determined on the basis of the blinker information acquired at the last S50. In case of a left turn, the process proceeds to S260. In case of no signal, the process proceeds to S270. In case of a right turn, the process proceeds to S280.

At S260, S270, and S280, on the basis of the hazard light information acquired at the last S60, a state of the hazard light is determined (ON or OFF).

When the hazard light is determined as OFF at S260, the process proceeds to the transition to the left rearward cropped screen in S290. When the hazard light is determined as ON at S260, the process proceeds to the transition to the left parallel-parking screen in S300. The transitions to the left rear cropped screen and to the left parallel-parking screen are mentioned later.

When the hazard light is determined as OFF at S270, the process proceeds to the transition to the rearward cropped screen in S300. When the hazard light is determined as ON at S270, the process proceeds to the transition to the rearward monitor screen in S320. The transitions to the rearward cropped screen and to the rearward monitor screen are mentioned later.

When the hazard light is determined as OFF at S280, the process proceeds to the transition to the right rearward cropped screen in S330. When the hazard light is determined as ON at S280, the process proceeds to the transition to the right parallel-parking screen in S340. The transitions to the right rearward cropped screen and to the right parallel-parking screen are mentioned later.

On the other hand, when it is determined at S240 that the shift position is at reverse, the process proceeds to S350. At S350, on the basis of the vehicle speed information acquired at the last S70, a vehicle speed of the vehicle 3 is acquired, and it is determined whether the vehicle speed is a predetermined vehicle speed V1 or over. When the vehicle speed is V1 or over, the process proceeds to S250, and when the vehicle speed is less than V1, the process proceeds to S360.

At S360, the screen of the display 7 remains unchanged (the type of the image to be displayed is not changed).

At S370, the shift position information is newly acquired and it is determined whether the shift position in the vehicle 3 has changed other than to the forward position. When the shift position has changed other than to the forward position, this processing ends, and when the shift position remains at the forward position, the process proceeds to S350.

Figure 12:
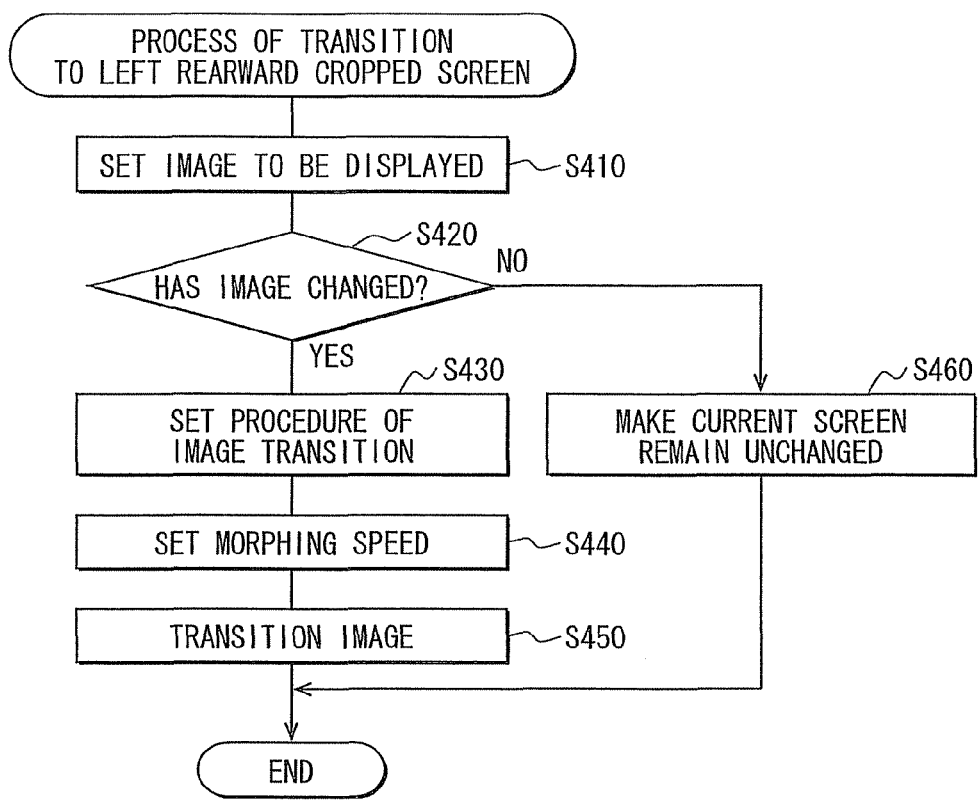
FIG. 12 is a flowchart showing the transition to a left rearward cropped screen executed by the rearward view assistance apparatus.

(4) Next, the transition to the left rearward cropped screen is explained in reference to the flowchart of FIG. 12.

At S410, an image to be displayed on the display 7 is set. Specifically, it is determined whether a vehicle speed acquired at S70 is the "low vehicle speed," "moderate vehicle speed," or "high vehicle speed." On the basis of the determination result, an image to be displayed on the display 7 is set as below.

In case of "low vehicle speed," the "left rearward cropped image (vehicle is at low speed or rest)" is displayed.

In case of "moderate vehicle speed," the "left rearward cropped image (vehicle is at moderate speed)" is displayed.

In case of "high vehicle speed," the "left rearward cropped image (vehicle is at high speed)" is displayed.

When predetermined regulation speeds are Va, Vb (Va<Vb), the "low vehicle speed" is less than Va, the "medium vehicle speed" is equal to or over Va and less than Vb, and the "high vehicle speed" is Vb or over.

At S420, it is determined whether the image that is set at S410 is different from the image currently displayed on the display 7. When the images differ from one another, the process proceeds to S430, and when the images are the same, the process proceeds to S460.

At S430, a procedure for transferring the image on the display 7 is set.

The specific procedure is as follows.

(a) In case where the image currently displayed on the display 7 is the right rearward cropped image The right rearward cropped image is first morphed to the rearward cropped image, and then to the left rearward cropped image that is set at S410. The rearward cropped image after the first morphing is the "rearward cropped image (vehicle is at low speed or rest)" when the left rearward cropped image that is set at S410 is the "left rearward cropped image (vehicle is at low speed or rest). The rearward cropped image after the first morphing is the "rearward cropped image (vehicle is at moderate speed)" when the left rearward cropped image that is set at S410 is the "left rearward cropped image (vehicle is at moderate speed). The rearward cropped image after the first morphing is the "rearward cropped image (vehicle is at high speed)" when the left rearward cropped image that is set at S410 is the "left rearward cropped image (vehicle is at high speed).

(b) In case where the image currently displayed on the display 7 is the "left rearward cropped image (vehicle is at low speed or rest)" and the image that is set at S410 is the "left rearward cropped image (vehicle is at high speed)"

The "left rearward cropped image (vehicle is at low speed or rest)" is first morphed to the "left rearward cropped image (vehicle is at moderate speed)," and then to the "left rearward cropped image (vehicle is at high speed)."

(c) In case where the image currently displayed on the display 7 is the "left rearward cropped image (vehicle is at high speed)," and the image that is set at S410 is the "Left Rearward Cropped Image (Vehicle is at Low Speed Or Rest)"

The "left rearward cropped image (vehicle is at high speed)" is morphed to the "left rearward cropped image (vehicle is at moderate speed)" at first, and then to the "left-rearward cropped image (vehicle is at low speed or rest)."

(d) In case other than the above (a) to (c)

The image currently displayed on the display 7 is morphed to the left rearward cropped image that is set at S410.

A morphing speed is set at S440. Fundamentally, the morphing speed is set as follows in response to the screen that is set at S410.

In case of the "left rearward cropped image (vehicle is at low speed or rest)," the morphing speed is set as "low."

In case of the "left rearward cropped image (vehicle is at moderate speed)," the morphing speed is set as "moderate."

In case of the "left rearward cropped image (vehicle is at high speed)," the morphing speed is set as "high."

In (a), the morphing speed is "high" in the morphing to the rearward cropped image. The morphing speed in the morphing to the left rearward cropped image is set in response to the screen set at S410, as described above.

In (b), the morphing speed in the morphing to the "left rearward cropped image (vehicle is at moderate speed)" is "moderate," and the morphing speed in the morphing to the "left rearward cropped image (vehicle is at high speed)" is "high."

In (c), the morphing speed in the morphing to the "left rearward cropped image (vehicle is at moderate speed)" is "moderate," and the morphing speed in the morphing to the "left rearward cropped image (vehicle is at low speed or rest)" is "low."

When the hazard information acquired at the previous S60 (to "the last" S60 by one main processing) is ON, the morphing speed is "high" regardless of the screen that is set at S410.

At S450, on the basis of the procedure of the image transition that is set at S430 and the morphing speed that is set at S440, the image transition is performed.

On the other hand, at S420, when it is determined that the image set at S410 is the same as the image currently displayed on the display 7, the process proceeds to S460, at which the screen of the display 7 remains unchanged (the type of the displayed image is not changed).

Figure 13:
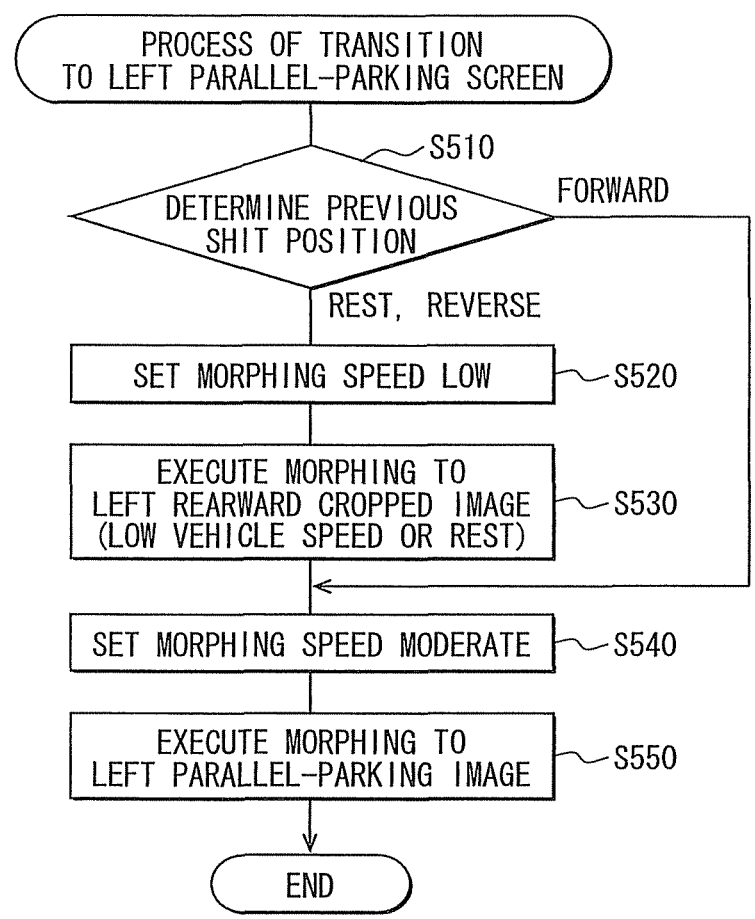
FIG. 13 is a flowchart showing the transition to a left parallel-parking screen executed by the rearward view assistance apparatus.

(5) Next, the transition to the left parallel-parking screen is explained in reference to the flowchart of FIG. 13.

At S510, on the basis of the shift position information acquired at the previous S40 (to "the last" S40 by one main processing), the previous shift position in the vehicle 3 is determined. When the previous shift position is at rest or reverse, the process proceeds to S520, and when the previous shift position is at forward, the process proceeds to S540.

At S520, the morphing speed is set as "low."

At S530, the image displayed on the display 7 is morphed to the "left rearward cropped screen (vehicle is at low speed or rest)." The morphing speed at this time is "low" that is set at S520.

At S540, the morphing speed is set as "moderate."

At S550, the image displayed on the display 7 is morphed to the left parallel-parking image. The morphing speed at this time is "moderate" that is set at S540

Figure 14:
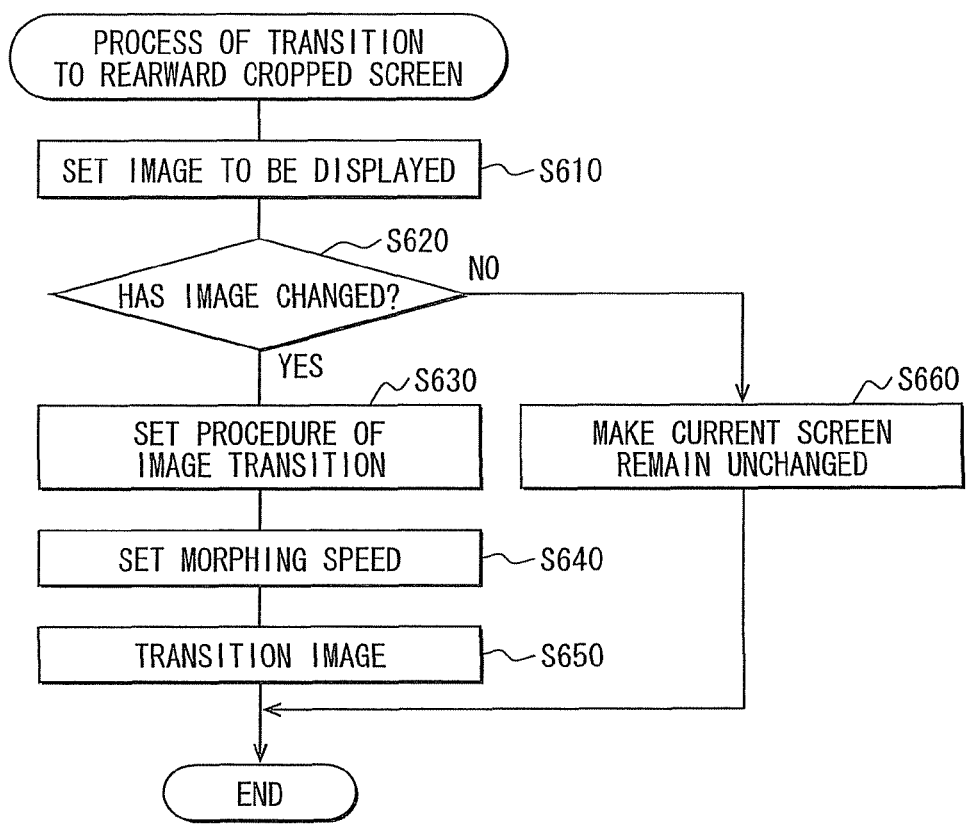
FIG. 14 is a flowchart showing the transition to a rearward cropped screen executed by the rearward view assistance apparatus.

(6) Next, the transition to the rearward cropped image is explained in reference to the flowchart of FIG. 14.

At S610, the image to be displayed on the display 7 is set. Specifically, it is determined whether a vehicle speed acquired at S70 is "low vehicle speed," "moderate vehicle speed," or "high vehicle speed." On the basis of the determination result, an image to be displayed on the display 7 is set as follows.

In case of "low vehicle speed," the image to be displayed is the "rearward cropped image (vehicle is at low speed or rest)."

In case of "moderate vehicle speed," the image to be displayed is the "rearward cropped image (vehicle is at moderate speed)."

In case of "high vehicle speed," the image to be displayed is the "rearward cropped image (vehicle is at high speed)."

When predetermined reference speeds are set as Va, Vb (Va<Vb), the "low vehicle speed" is less than Va, the "moderate vehicle speed is equal to or over Va" and less than Vb, and the "high vehicle speed" is Vb or over.

At S620, it is determined whether the image that is set up at S610 is different from the image currently displayed on the display 7. When the images are different, the process proceeds to S630, and when the images are the same, the process proceeds to S660.

At S630, a procedure to transfer the image on the display 7 is set. Specifically, this setting is as follows.

(e) In case where the image currently displayed on the display 7 is the "rearward cropped image (vehicle is at low speed or rest)" and the image that is set at S610 is the "rearward cropped image (vehicle is at high speed)"

The "rearward cropped image (vehicle is at low speed or rest)" is morphed to the "rearward cropped image (vehicle is at moderate speed)" at first, and then to the "rearward cropped image (vehicle is at high speed)."

(f) In case where the image currently displayed on the display 7 is the "rearward cropped image (vehicle is at high speed)" and the image that is set at S610 is the "rearward cropped image (vehicle is at low speed or rest)"

The "rearward cropped image (vehicle is at high speed)" is morphed to the "rearward cropped image (vehicle is at moderate speed)" at first, and then to the "rearward cropped image (low vehicle speed or vehicle rest)."

(g) In case other than (e) to (f)

The image currently displayed on the display 7 is morphed to the left rearward cropped image that is set at S610.

The morphing speed is set at S640. Fundamentally, the morphing speed is set as follows in response to the screen that is at S610.

In case of the "rearward cropped image (vehicle is at low speed or rest)," the morphing speed is set as "low."

In case of the "rearward cropped image (vehicle is at moderate speed)," the morphing speed is set as "moderate."

In case of the "rearward cropped image (vehicle is at high speed)," the morphing speed is set as "high."

In (e), the morphing speed in the morphing to the "rearward cropped image (vehicle is at moderate speed)" is "moderate," and the morphing speed in the morphing to the "rearward cropped image (vehicle is at high speed)" is "high."

In (f), the morphing speed in the morphing to the "rearward cropped image (vehicle is at moderate speed)" is "moderate," and the morphing speed in the morphing to the "rearward cropped image (vehicle is at low speed or rest)" is "low."

When the blinker information acquired at the previous S50 (to "the last" S50 by one main processing) shows other than no signal or when the hazard light information acquired at the previous S60 (to "the last" S60 by one main processing) shows ON, the morphing speed is "high" regardless of the screen that is set at S610.

When the shift position information acquired at the previous S40 (to the "last" S40 by one main processing) is at rest or reverse, the morphing speed is "low" regardless of the screen that is set at S610.

At S650, the image transition is performed on the basis of the procedure of the image transition that is set at S630 and the morphing speed that is set at S640.

On the other hand, at S620, when it is determined that the image that is set at S610 is the same as the image currently displayed on the display 7, the process proceeds to S660, at which the screen on the display 7 remains unchanged (the type of the displayed image is not changed).

Figure 15:
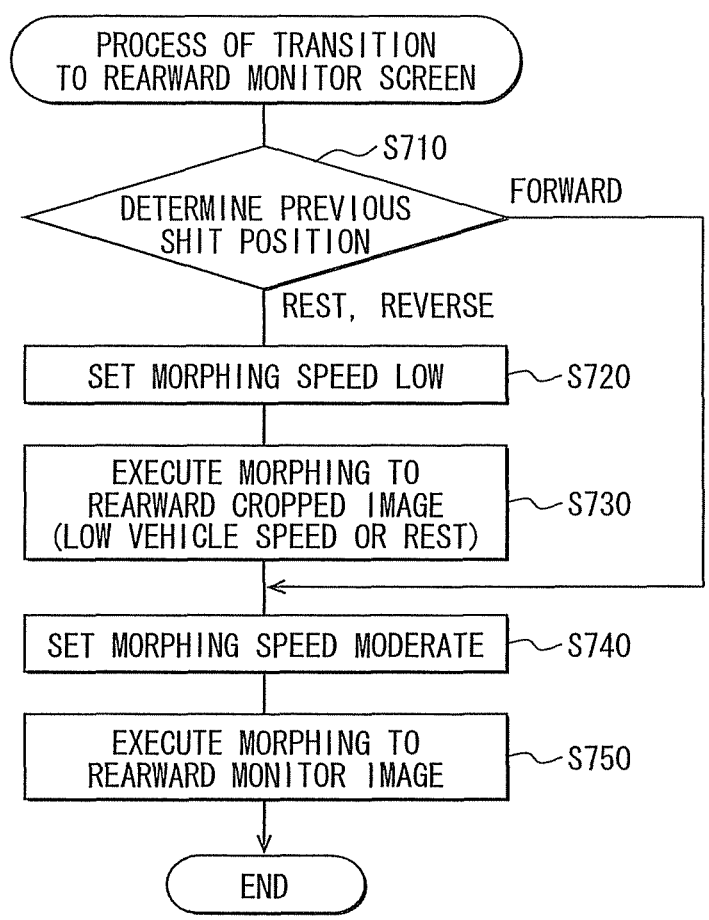
FIG. 15 is a flowchart showing the transition to a rearward monitor screen executed by the rearward view assistance apparatus.

(7) Next, the transition to the rearward monitor screen is explained in reference to the flowchart of FIG. 15.

At S710, on the basis of the shift position information acquired at the previous S40 (to the "last" S40 by one main processing), the previous shift position of the vehicle 3 is determined. When the shift position is at rest or reverse, the process proceeds to S720, and when the shift position is at forward, the process proceeds to S740.

At S720, the morphing speed is set as "low."

At S730, the image displayed on the display 7 is morphed to the "rearward cropped image (vehicle is at low speed or rest)." The morphing speed at this time is "low" that is set at S720.

At S740, the morphing speed is set as "moderate."

At S750, the image displayed on the display 7 is morphed to the rearward monitor image. The morphing speed at this time is "moderate" that is set at S740.

Figure 16:
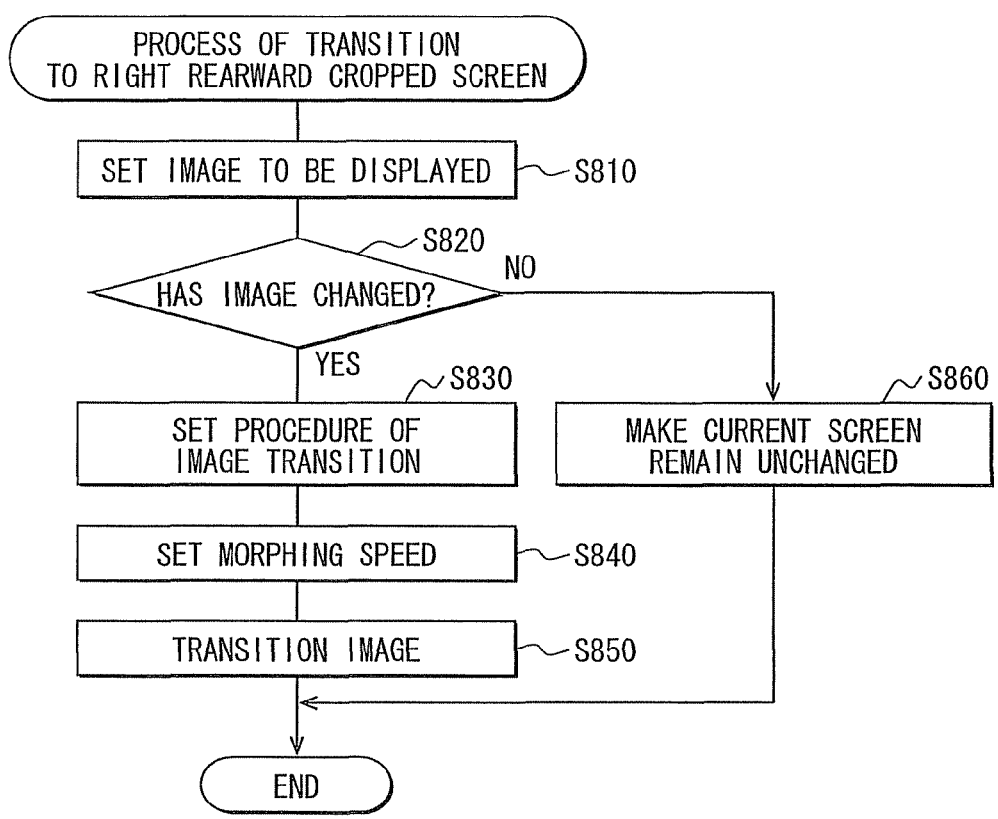
FIG. 16 is a flowchart showing the transition to a right rearward cropped screen executed by the rearward view assistance apparatus.

(8) Next, the transition to the right rearward cropped screen is explained in reference to the flowchart of FIG. 16.

At S810, an image to be displayed on the display 7 is set. Specifically, it is determined whether the vehicle speed acquired at the last S70 is "low vehicle speed," "moderate vehicle speed," or "high vehicle speed." On the basis of the determination result, the image to be displayed on the display 7 is set as follows.

In case of "low vehicle speed," the image to be displayed is the "right rearward cropped image (vehicle is at low speed or rest)."

In case of "moderate vehicle speed," the image to be displayed is the "right rearward cropped image (vehicle is at moderate speed)."

In case of "high vehicle speed," the image to be displayed is the "right rearward cropped image (vehicle is at high speed)."

When predetermined reference speeds are Va, Vb (Va<Vb), the "low vehicle speed" is under Va, the "moderate vehicle speed" is equal to or over Va and under Vb, and the "high vehicle speed" is Vb or over.

At S820, it is determined whether the image that is set at S810 is different from the image currently displayed on the display 7. When the images are different, the process proceeds to S830, and when the images are the same, the process proceeds to S860.

At S830, a procedure is set to transfer the image of the display 7. Specifically, the transition is as follows.

(h) In case where the image currently displayed on the display 7 is the left rearward cropped image The left rearward cropped image is morphed to the rearward cropped image at first, and then to the right rearward cropped image that is set at S810. The rearward cropped image after the first morphing is the "rearward cropped image (vehicle is at low speed or rest)" when the right rearward cropped image that is set at S810 is the "right rearward cropped image (vehicle is at low speed or rest)." The rearward cropped image after the first morphing is the "rearward cropped image (vehicle is at moderate speed)" when the right rearward cropped image that is set at S810 is the "right rearward cropped image (vehicle is at moderate speed)." The rearward cropped image after the first morphing is the "rearward cropped image (vehicle is at high speed)" when the right rearward cropped image that is set at S810 is the "right rearward cropped image (vehicle is at high speed)."

(i) In case where the image currently displayed on the display 7 is the "right rearward cropped image (vehicle is at low speed or rest)" and the image that is set at S810 is the "right rearward cropped image (vehicle is at high speed)"

The "right rearward cropped image (vehicle is at low speed or rest)" is morphed to the "right rearward cropped image (vehicle is at moderate speed)" at first, and then to the "right rearward cropped image (vehicle is at high speed)."

(j) In case where the image currently displayed on the display 7 is the "right rearward cropped image (vehicle is at high speed)" and the image that is set at S810 is the "right rearward cropped image (vehicle is at low speed or rest)"

The "right rearward cropped image (vehicle is at high speed)" is morphed to the "right rearward cropped image (vehicle is at moderate speed)" at first, and then to the "right rearward cropped image (vehicle is at low speed or rest)."

(k) Case other than (h) to (j)

The image currently displayed on the display 7 is morphed to the right rearward cropped image that is set at S810.

The morphing speed is set at S840. Fundamentally, the morphing speed is set as follows in response to the screen set at S810.

In case of the "right rearward cropped image (vehicle is at low speed or rest)," the morphing speed is set as "low."

In case of the "right rearward cropped image (vehicle is at moderate speed)," the morphing speed is set as "moderate."

In case of the "right rearward cropped image (vehicle is at high speed)," the morphing speed is set as "high."

In (h), the morphing speed is "high" in the morphing to the rearward cropped image. The morphing speed in the morphing to the right rearward cropped image is set in response to the screen that is set at S810, as described above.

In (i), the morphing speed in the morphing to the "right rearward cropped image (vehicle is at moderate speed)" is "moderate," and the morphing speed in the morphing to the "right rearward cropped image (vehicle is at high speed)" is "high."

In (j), the morphing speed in the morphing to the "right rearward cropped image (vehicle is at moderate speed)" is "moderate," and the morphing speed in the morphing to the "right rearward cropped image (vehicle is at low speed or rest)" is "low."

When the hazard information acquired at the previous S60 (to "the last S60" by one main processing) is ON, the morphing speed is "high" regardless of the screen that is set at S810.

At S850, on the basis of the procedure of the image transition that is set at S830 and the morphing speed that is set at S840, the image transition is performed.

On the other hand, when it is determined at S820 that the image that is set at S810 is the same as the image currently displayed on the display 7, the process proceeds to S860, at which the screen on the display 7 remains unchanged (the type of the displayed image is not changed).

Figure 17:
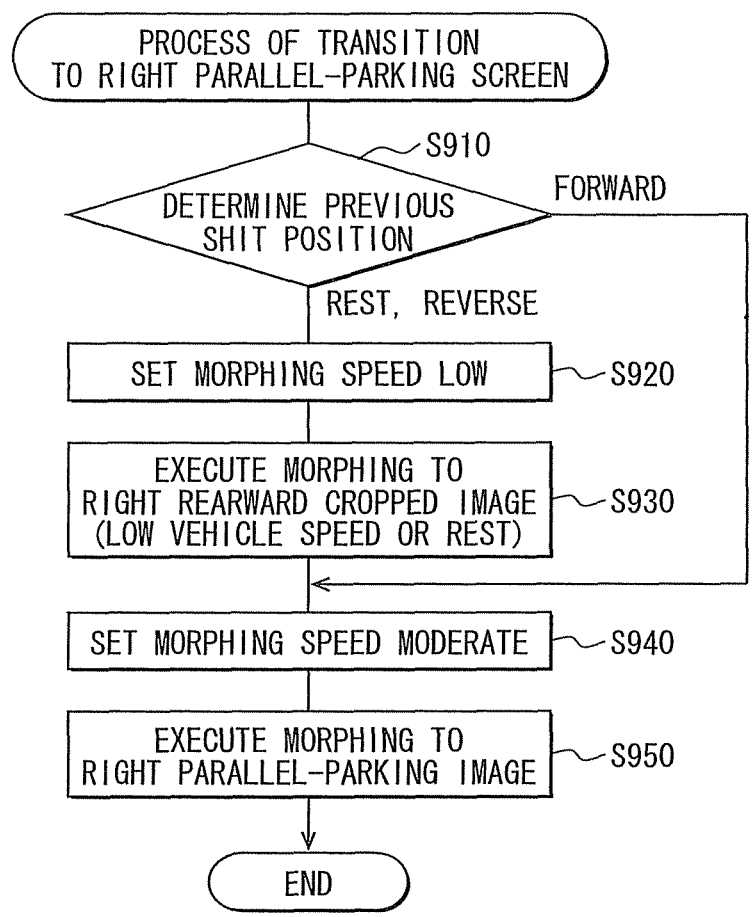
FIG. 17 is a flowchart showing the transition to a right parallel-parking screen executed by the rearward view assistance apparatus.

(9) Next, the transition to the right parallel-parking screen is explained in reference to the flowchart of FIG. 17.

At S910, on the basis of the shift position information acquired at the previous S40 (to "the last" S40 by one main processing), the previous shift position of the vehicle 3 is determined. When the previous shift position is at rest or reverse, the process proceeds to S920, and when the previous shift position is at forward, the process proceeds to S940.

At S920, the morphing speed is set as "low."

At S930, the image displayed on the display 7 is morphed to the "right rearward cropped screen (vehicle is at low speed or rest)." The morphing speed at this time is "low" that is set at S920.

At S940, the morphing speed is set as "moderate."

At S950, the image displayed on the display 7 is morphed to the right parallel-parking image. The morphing speed at this time is "moderate" that is set at S940.

4. Advantageous effects by the rearward view assistance apparatus 1

(1) According to the rearward view assistance apparatus 1, a rearward image taken by the camera 5 can be displayed on the display 7. Therefore, rearward viewing is possible even when passengers are present on the seats in the second and third rows in the vehicle 3.

(2) The rearward view assistance apparatus 1 is capable of displaying, on the display 7, the images (the rearward cropped image, left rearward cropped image, and right rearward cropped image) of a partial region cropped from an image taken by the camera 5 when the vehicle travels forward. Accordingly, a driver can view rearward easier than when the overall image (vehicle rearward image) taken by the camera 5 is displayed.

(3) In the rearward view assistance apparatus 1, the lower portions of the rearward cropped image, left rearward cropped image, right rearward cropped image, left parallel-parking image, and right parallel-parking image displayed on the display 7 are each overlaid with the mask 11 that covers the lower portions of the images and the outline 13 that shows the shape of the vehicle 3. The images being overlaid with the mask 11, the region where a road appears to move during forward travel is made small in the images, so that the driver has less stress. Additionally, the outline 13 showing the shape of the rear portion of the vehicle 3 is displayed, so that the driver can intuitively realize a positional relationship between the subject vehicle (vehicle 3) and a following vehicle, which follows the subject vehicle, displayed on the display 7.

(4) The rearward view assistance apparatus 1 sets the cropped image smaller as the speed of the vehicle 3 is higher when displaying the rearward cropped image, left rearward cropped image, and right rearward cropped image on the display 7. In general, as a vehicle speed is higher, a following distance is longer. Thus, a following vehicle is displayed small in an image not yet cropped. As described above, a region of a cropped image is made smaller as a vehicle speed is higher, so that a ratio of occupation of a following vehicle is made high in the cropped image for easy viewing.

(5) The rearward view assistance apparatus 1 uses morphing to transfer the image displayed on the display 7. This enables smooth image transition, so that the driver does not feel uncomfortable. The speed of morphing is set higher as the vehicle speed of the vehicle 3 is higher. Accordingly, when the speed of the vehicle 3 is high and a rearward view may be needed quickly, the morphing does not continue for too long a time.

(6) In the rearward view assistance apparatus 1, when the blinker shows a right turn, a more rightward image (right rearward cropped image) is displayed on the display 7 than when the blinker shows no signal. In addition, when the blinker shows a left turn, a more leftward image (left rearward cropped image) is displayed on the display 7 than when the blinker shows no signal. Thus, in response to the drive condition, the driver can ensure a necessary view.

(7) In the rearward view assistance apparatus 1, the speed of morphing when the blinker stops showing a right or left turn is higher than that when the blinker starts showing a right or left turn. In general, when the blinker stops showing a right or left turn, a lane change is complete and instantly a rearview may be needed. As mentioned above, the speed of morphing in this case is made high to end the morphing for a short time and thereby to obtain a rearview instantly.

(8) In the rearward view assistance apparatus 1, when the hazard light is ON, the cropped image displayed on the display 7 is made larger than when the hazard light is OFF. In general, when the hazard light is ON, a wide rearview may be needed, for example, for parallel parking. As described above, when the hazard light is ON and a region of the cropped image displayed on the display 7 is made large for easy parallel parking etc.

(9) In the rearward view assistance apparatus 1, when transferring the image displayed on the display 7 greatly, the image transitions to an intermediate image once, and then to a final image. Specifically, when the right rearward cropped image transitions to the left rearward cropped image, the right rearward cropped image transitions to the rearward cropped image once, and then to the left rearward cropped image. When the left rearward cropped image transitions to the right rearward cropped image, the left rearward cropped image transitions to the rearward cropped image once, and then to the right rearward cropped image.

When the "rearward cropped image (vehicle is at high speed)" transitions to the "rearward cropped image (vehicle is at low speed or rest)," the "rearward cropped image (vehicle is at high speed)" transitions to the "rearward cropped image (vehicle is at moderate speed)" once, and then to the "rearward cropped image (vehicle is at low speed or rest)." When the "rearward cropped image (vehicle is at low speed or rest)" transitions to the "rearward cropped image (vehicle is at high speed)," the "rearward cropped image (vehicle is at low speed or rest)" transitions to the "rearward cropped image (vehicle is at moderate speed)" once, and then to the "rearward cropped image (vehicle is at high speed)." When the left rearward cropped image and the right rearward cropped image at a high vehicle speed transitions to ones at a low speed or rest and in case of its reverse transition, the same transitions as the above are performed.

In such a transition as the above, the image transition is not performed suddenly greatly, but becomes smooth, so that the driver does not feel uncomfortable greatly.

(10) In the rearward view assistance apparatus 1, when the shift position is changed from reverse (the state where the rest/reverse image is displayed) to forward, the rest/reverse image remains displayed on the display 7 unless the vehicle speed becomes V1 or over or the shift position is changed again (see S240, S350, S360, and S370). Therefore, when forward and reverse are shifted frequently, the image displayed on the display 7 is not changed frequently, and thus the driver does not feel uncomfortable.

It is noted that the present invention is not limited by the above embodiments, and various configurations and modifications are possible without departing from the scope of the present invention.

For example, the image transition using a "high" speed morphing may be performed instantly without morphing.

The types of the cropped images are not limited to the images of three stages: low vehicle speed or vehicle rest; moderate vehicle speed; and high vehicle speed. For example, the number of the stages may be two, four, five, six, or so on. In proportion to the vehicle speed, a size of a region of the cropped image may be set without stages (linearly).

While aspects of the disclosure described herein are already recited in the preceding summary, further optional aspects thereto may be set out as follows.

For instance, as an optional aspect of the disclosure, in the rearward view assistance apparatus, the control circuit may overlay a lower portion of the cropped image with a mask. By overlaying the lower portion of the cropped image with the mask, a region where a road appears to move is made small in the cropped image. Therefore, the driver does not feel uncomfortable greatly.

Further, as an optional aspect of the disclosure, the control circuit may display a rear portion of the vehicle itself in the cropped image or on the mask with which the lower portion of the cropped image is overlaid. By displaying an indication (for example, an outline showing a shape of the rear portion of the vehicle itself) corresponding to the rear portion of the vehicle, a positional relationship between the vehicle and a following vehicle can be understood intuitively.

Further, as an optional aspect of the disclosure, a vehicle speed detection device may be included to detect a speed of the vehicle. The control circuit may set the cropped image smaller as the vehicle speed is higher. In general, as a vehicle speed is higher, a following distance is longer and a following vehicle is displayed smaller on the vehicle rearward image. As described above, as the vehicle speed is higher, a region of the cropped image is made smaller to increase a ratio of occupation of the following vehicle in the cropped image for easy viewing.

Further, in the above optional aspect, the control circuit may change the cropped image in response to a change of the vehicle speed, and use morphing when transferring the cropped image displayed on the display device. A speed of the morphing may be higher as the vehicle speed in the transition is higher.

The morphing is used for smooth transition of the cropped image displayed on the display device, so that a driver does not feel uncomfortable greatly. As the vehicle speed is higher, the speed of morphing is set higher. Therefore, when the vehicle speed is higher and a rearward view may be required instantly, the morphing does not continue for too long a time.

Further, as an optional aspect of the disclosure, a blinker detection device may be included to detect a state of a blinker of the vehicle. The control circuit may set a position of the cropped image in the vehicle rearward image more rightward when the blinker shows a right turn than when the blinker shows no signal. The control circuit may set a position of the cropped image in the vehicle rearward image more leftward when the blinker shows a left turn than when the blinker shows no signal. In such a way, a required view can be ensured for a driver in response to a driving condition.

In the above optional aspect, the control circuit may change the cropped image in response to a state of the blinker, and use morphing when transferring the cropped image displayed on the display device. A speed of the morphing when the blinker stops indicating a right or left turn may be higher than that of the morphing when the blinker starts indicating a right or left turn.

In general, when the blinker stops indicating a right or left turn, a lane change is completed and a rearview may be instantly required. As mentioned above, the morphing speed in this case is made high to complete the morphing for a short time and accordingly to obtain a rearview quickly.

Further, as an optional aspect of the disclosure, a hazard detection device may be included to detect a state of a hazard light of the vehicle. When the hazard light is ON, the control circuit may make the cropped image larger than when the hazard light is OFF. In general, when the hazard light is ON, a wide rearview may be required such as in case of parallel parking. As described above, when the hazard light is ON, the cropped image is made large, parallel parking becomes easy.

What is claimed is:

1. A rearward view assistance apparatus for a vehicle, the apparatus comprising:

an imaging device that takes an image rearward from the vehicle to acquire a vehicle rearward image;

a control circuit that sets a cropped image by cropping part of the vehicle rearward image in response to a state of the vehicle;

a display device that is provided in a passenger compartment of the vehicle and displays the cropped image; and a blinker detection device that detects a state of a blinker of the vehicle, the blinker indicating (i) a left turn, (ii) a right turn, or (iii) no signal indicating no turn;

wherein:

the control circuit sets a first position of the cropped image in the vehicle rearward image when the blinker indicates the no turn, sets a second position of the cropped image in the vehicle rearward image when the blinker indicates the right turn, the second position being more rightward in the vehicle rearward image than the first position, and sets a third position of the cropped image in the vehicle rearward image when the blinker indicates the left turn, the third position being more leftward in the vehicle rearward image than the first position;

the control circuit performs transition of the cropped image in response to a change of the state of the blinker by gradually transferring the cropped image displayed on the display device between the first position, the second position, and the third position; and a speed of transferring the cropped image from the second position or the third position to the first position when the blinker stops indicating the right turn or the left turn, respectively, is higher than a speed of transferring the cropped image from the first position to the second position or the third position when the blinker starts indicating the right turn or the left turn, respectively.

2. The rearward view assistance apparatus according to claim 1, wherein the control circuit overlays a lower portion of the cropped image with a mask.

3. The rearward view assistance apparatus according to claim 2, wherein the control circuit provides an indication corresponding to a rear portion of the vehicle on the mask with which the lower portion of the cropped image is overlaid.

4. The rearward view assistance apparatus according to claim 1, wherein the control circuit provides an indication corresponding to a rear portion of the vehicle in the cropped image.

5. The rearward view assistance apparatus according to claim 1, further comprising a vehicle speed detection device that detects a vehicle speed of the vehicle, wherein the control circuit sets a region of the cropped image in the vehicle rearward image to be smaller as the vehicle speed is higher.

6. The rearward view assistance apparatus according to claim 5, wherein:

the control circuit performs the transition of the cropped image in response to a change of the vehicle speed by gradually changing the cropped image displayed on the display device; and a speed of the transition of the cropped image is higher when the vehicle speed at a time of performing the transition is higher.

7. The rearward view assistance apparatus according to claim 1, further comprising a hazard detection device that detects a state of a hazard light of the vehicle, wherein the control circuit sets the cropped image larger when the hazard light is ON than when the hazard light is OFF.

* * * * *